United States Patent

Wilhelm

[15] 3,655,998

[45] Apr. 11, 1972

[54] LOGICAL GATE SWITCHING CIRCUIT IN ECL-SWITCHING CIRCUIT TECHNIQUE

[72] Inventor: Wilhelm Wilhelm, Munich, Germany

[73] Assignee: Siemens Aktiengesellschaft, Berlin and Munich, Germany

[22] Filed: Aug. 21, 1970

[21] Appl. No.: 65,777

[30] Foreign Application Priority Data

Aug. 25, 1969 Germany ......................P 19 43 205.4

[52] U.S. Cl.................................307/215, 307/218, 307/299

[51] Int. Cl................H03k 19/34, H03k 19/36, H03k 19/22

[58] Field of Search...............................307/215, 218, 299 A

[56] References Cited

UNITED STATES PATENTS

| | | | |
|---|---|---|---|
| 3,321,639 | 5/1967 | Fowler et al. | 307/218 X |
| 3,351,782 | 11/1967 | Narud et al. | 307/213 |

*Primary Examiner*—John Zazworsky
*Attorney*—Hill, Sherman, Meroni, Gross & Simpson

[57] ABSTRACT

A logical gate switching circuit in ECL-switching circuit technique, which is designed as a push-pull circuit for the logical linkage of input signals in both their normal form and their inverted form, preferably having a differential amplifier cooperable therewith employing two emitter-coupled transistors and including a multi-emitter transistor, respective emitters of which are operatively controlled by the input signals in their inverted form.

8 Claims, 3 Drawing Figures

Patented April 11, 1972 3,655,998

INVENTOR
*Wilhelm Wilhelm*

BY *Hill, Sherman, Meroni, Gross & Simpson* ATTYS.

LOGICAL GATE SWITCHING CIRCUIT IN ECL-SWITCHING CIRCUIT TECHNIQUE

BACKGROUND OF THE INVENTION

The continuous progress in the reduction in the size of simple and complex logical switching circuits in data processing devices and similar equipment results not only from the desire to effect the reduction in the exterior dimensions of such devices but as an essential prerequisite for an increase in the maximum operational speeds of such circuits.

With the present state of technology it is possible to attain short signal-transit times in the range of nano seconds, particularly by the application of the so-called ECL-switching circuit technique, the basic element of which is a differential amplifier employing emitter-coupled transistors which are not conducted into a state of saturation. Connection lines, which may have to be relatively long, in themselves produce a material part of the entire transit time. Consequently it is advantageous not only to produce individual gates but larger complexes of logical switching circuits in an integrated construction. Here, however, appears the difficulty of withdrawing, by suitable cooling measures, the amount of heat resulting from a power loss is a very small area. It is therefore advantageous to endeavor to reduce the power loss by means of suitable selection and dimensioning of the logical structure forming the switching circuits. It has heretofore been pointed out (see "EEE" June 1968, pages 76 through 78, particularly page 78, right column) that the application of the circuit principles "wired OR" and "series coupling" with ECL-switching circuits results in advantages not only in this respect but also permits an increase in the number and magnitude of logical linkages without a substantial increase in the signal transit time.

The invention is directed to the problem of providing a gate switching circuit in ECL-switching circuit technique for the creation of logical linkages, which has a materially lower power loss and gate transit time than prior ECL gate switching circuits for the creation of similar logical linkages. The problem is solved by the provision of a gate switching circuit which is designed as a push-pull circuit for the logical linkage of the input signals both in their normal form and their inverted form, hereinafter referred to as a "push-pull gate."

The utilization of differential amplifiers which are controlled by means of two signals, which do not always coincide with regard to their instantaneous amplitudes and/or polarities, and in which the output signals are proportional to the difference of the input signals, are generally known, particularly in analog technology. Fluctuations which involve both input signals in the same manner are not transmitted, such property being termed push-push suppression.

Differential amplifiers employing emitter-coupled transistors are also utilized in digital systems with very high pulse sequence, in connection with the transmission of signals over relatively long connection lines. Such signals are transmitted, both in their normal form and in their inverted form, over symmetrical lines, for example in the form of twisted wires or strip lines with closely adjacent conductor paths. (See "EEE," June 1968, page 76, FIG. 7, and page 78, left column.) As a result the following advantages are derived therefrom:

(a. The push-pull lines which extend parallel to each other with very little space therebetween have very little interference effect as the resulting magnetic or electric field of the line pair can be disregarded.

(b. Interference has little effect on the signals as such interference effects both lines of the pair in like manner, while push-push interferences may be suppressed in the differential amplifier.

(c. Interferences involving ground potential likewise are non-critical due to the push-push suppression.

The last described prior arrangement is not suitable for the logical linkages of several input signals. However, the invention utilizes the advantages of such type of circuit, particularly with regard to the low interference sensitivity.

SUMMARY OF THE INVENTION

The present invention, as previously mentioned, provides a gate switching circuit in the form of a push-pull circuit in which the input signals are linked in both their normal form and their inverted form. The normal input signals are applied to one gate structure and the inverted input signals applied to another gate structure, with the outputs of the respective gate structures being conducted to a differential amplifier, the outputs of which form the normal and inverted outputs of the circuit. Advantageously, the differential amplifier can be constructed as an integral part of the linkage circuits.

BRIEF DESCRIPTION OF THE DRAWINGS

In the drawings wherein like reference characters indicate like or corresponding parts.

DETAILED DESCRIPTION OF THE INVENTION

Figure 1:
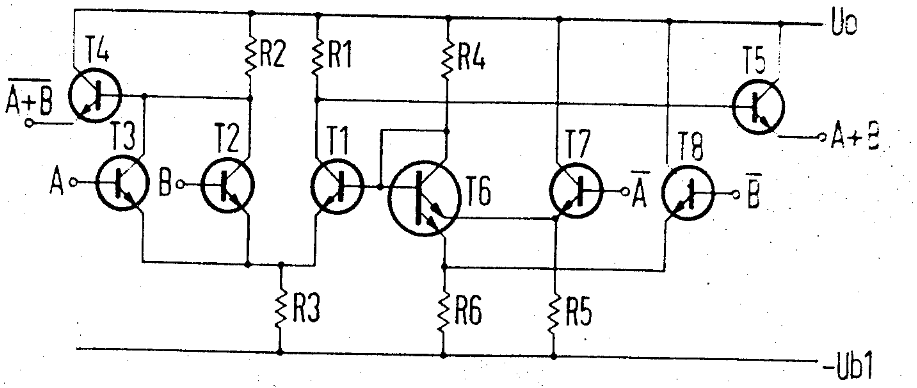
FIG. 1, represents a schematic circuit of an OR-NOR push-pull gate having a signal gain of 400 mV.

Referring to the drawings and more particularly to FIG. 1, there is illustrated a differential amplifier having transistors T1 and T2, together with collector resistors R1, R2 and emitter resistor R3 which is common to both transistors, such circuit forming the central component of an OR-NOR push-pull gate. A transistor T3 has its emitter-collector path connected in parallel with the emitter-collector path of the transistor T2 and the two connected collectors of such transistors are connected to the base of an additional transistor T4 which is operated as an emitter follower and at which appears the inverted output signal of the gate with a signal level suitable for the control of additional correspondingly arranged switching circuits.

In corresponding manner a transistor T5 has its base connected to the collector of the transistor T1, forming an emitter follower circuit at which appears the non-inverted output signal.

If it is assumed, in opposition to the actual circuit illustrated, that the base of the transistor T1 has a fixed auxiliary potential applied thereto, the portion of the circuit thus far described will generally correspond to a prior single-ended gate circuit for the OR or NOR linkage of the corresponding signals appearing at the terminals A and B. However, the base of the transistor T1, which forms a part of the differential amplifier, actually is connected to the base and collector of a multiple-emitter transistor T6, and over the resistors R4 with a reference potential Uo. The emitters of the transistor T6, comprising two in the embodiment illustrated, are adapted to be controlled by means of the inverted input signals $\overline{A}$ and $\overline{B}$ over the emitter follower circuits comprising the transistor T7 and resistor R5 or the transistor T8 and resistor R6, respectively, with this part of the entire circuit forming an AND linkage of the inverted input signals $\overline{A}$ and $\overline{B}$.

Figure 2:
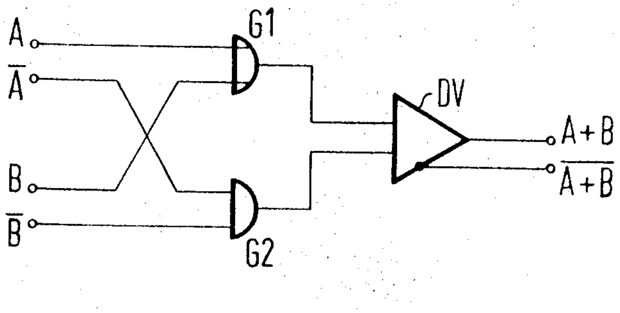
FIG. 2, illustrates a logical function circuit in block form employing a push-pull gate according to FIG. 1.

The logical function block circuit for the push-pull gate illustrated in FIG. 1 is shown in FIG. 2. It will be noted that the input signals $\overline{A}$ and $\overline{B}$ are linked by means of the OR gate G1 and the inverted input signals A and B are linked by means of the AND gate G2. The outputs of the gates are connected with respective inputs of the differential amplifier DV, with the outputs of the differential amplifier then respectively comprising the signals A+B and $\overline{A+B}$.

It will be apparent from the functional block circuit of Fig. 2 that in consideration of the known rules of switching algebra, an AND-NAND linkage can be obtained by effecting a reversal of the inputs for the signals in the normal form with the inputs for the inverted signals.

The applicability of the illustration of FIG. 2 as an equivalent circuit diagram for the circuit arrangement illustrated in FIG. 1, is limited to the general overall presentation with respect to the logical behavior of the push-pull gate. As illustrated in FIG. 1, there is no separation between the linkage circuits and the differential amplifier. Instead, the differential amplifier is itself a part of the respective linkage circuits.

Due to the doubling of the effective control voltage resulting with push-pull control of the differential amplifier, as opposed to a one-sided control, the push-pull gate can be operated with only half of the signal gain commonly required with single ended gates of approximately 0.8 volts, without loss of immunity to static interference. If the low interference-sensitivity of the parallel lines for the in-phase-opposed signals is taken into consideration, in connection with the push-pull suppression of differential amplifiers, it is even possible to obtain an overall increase in interference resistance or immunity in spite of the halving of the signal gain.

Such reduction of the signal gain also permits a lowering of the power input by approximately a factor of 2, assuming equivalent current loads. Furthermore, there results a lowering of the gate transit time, as any stray or marginal layer capacities which may be present are thereby required to be loaded to only one-half the voltage otherwise necessary. In addition thereto there are derived the further advantages that auxiliary voltages which are needed with single-ended gates may be omitted and the adverse influence of tolerances of constructional elements with respect to resistance to interference is lower. Likewise, as a result of the unusually extremely low interference sensitivity of a system employing push-pull gates, a further reduction in signal gain is possible.

Figure 3:
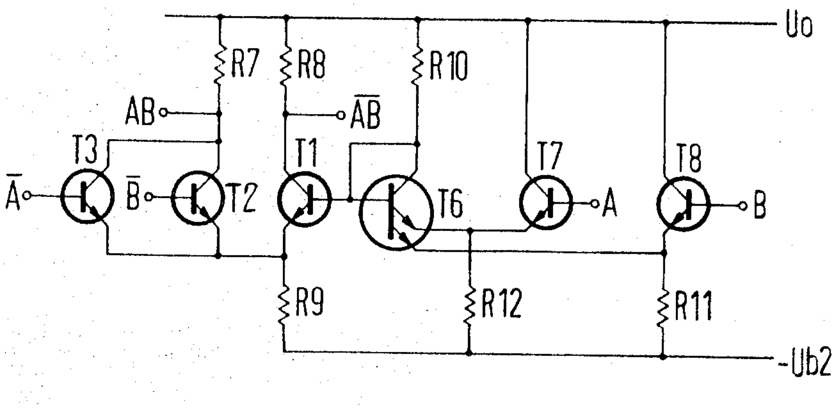
FIG. 3 is a circuit diagram, similar to FIG. 1, of an AND-NAND push-pull gate with a signal gain of 200 mV.

FIG. 3 by way of example, illustrates a circuit embodiment in an AND and NAND gate which is designed for operation with a signal gain of 200 mV. As the circuit is constructed very similar to the gate illustrated in FIG. 1, corresponding transistors are similarly designated. Due to the low signal gain, a level shifting of the output signals is unnecessary and the transistors T4 and T5 of the circuit of FIG. 1 are therefore omitted in the embodiment illustrated in FIG. 3. By way of example, for the dimensioning of a push-pull gate according to FIG. 3, the following values may be employed:

Resistors R7, R8 = 50 ohms
Resistor R9 = 100 ohms
Resistors R10, R11, R12 = 200 ohms
Operating voltage Ub2 = 1.2 v.
Signal level for logical "1" OV
Signal level for logical "o" –0.2 v. relative the reference potential Uo With the values above set forth, a power input of 9.6 mW resulted with a signal transit time of 0.5 ns, utilizing transistors with a limiting frequency of 2 GHz.

Having thus described my invention it will be obvious that various immaterial modifications may be made in the same without departing from the spirit of my invention.

I claim as my invention:

1. A logical gate switching circuit for the OR-NOR linkage of several input signals, employing ECL-switching circuit technique, for logical linkage of several input, signals, in the form of a push-pull circuit comprising an input circuit and an output circuit coupled thereto, the input circuit being constructed to receive input signals in both their normal form and their inverted form, and an output circuit, responsive to predetermined signals at the input circuit comprising a differential amplifier having two emitter-coupled transistors, an additional transistor, having its collector-emitter path connected in parallel with the collector-emitter path of one of said differential amplifier transistors, said additional transistor and said one amplifier transistor being circuited for control by respective input signals in their normal form, a multi-emitter transistor, the base of said other transistor of said differential amplifier being connected to a reference potential over a resistor, and to the base and the collector of said multi-emitter transistor, an emitter-follower transistor for each input signal in its inverted form, each of which is operatively connected to a respective emitter of said multi-emitter transistor.

2. A gate switching circuit according to claim 1, comprising in further combination, an output transistor for each transistor of said differential amplifier having its base connected to the collector of a respective amplifier transistor, and emitter forming the output for the associated amplifier transistor, with the linked signals appearing in normal form at the one output and in inverted form at the other.

3. A logical gate switching circuit for the AND-NAND linkage of several input signals, employing ECL-switching circuit technique, for logical linkage of several input signals, in the form of a push-pull circuit comprising an input circuit coupled thereto, the input circuit being constructed to receive input signals in both their normal form and their inverted form, and an output circuit, responsive to predetermined signals at the input circuit comprising a differential amplifier having two emitter-coupled transistors, an additional transistor, having its collector-emitter path connected in parallel with the collector-emitter path of one of said differential amplifier transistors, said additional transistor and said one amplifier transistor being circuited for control by respective input signals in their inverted form, a multi-emitter transistor the base of said other transistor of said differential amplifier being connected to a reference potential over a resistor, and to the base and the collector of said multi-emitter transistor, an emitter-follower transistor for each input signal in its normal form, each of which is operatively connected to a respective emitter of said multi-emitter transistor. 3, 4. A gate switching circuit according to claim 3, comprising in further combination, an output transistor each transistor of said differential amplifier having its base connected to the collector of a respective amplifier transistor, and emitter forming the output for the associated amplifier transistor, with the linked signals appearing in normal form at the one output and in inverted form at the other.

5. A logical gate switching circuit, employing ECL-switching circuit technique, for logical linkage of a plurality of input signals both in their normal form and in their inverted form, employing a push-pull circuit, comprising a differential amplifier, one side of which includes a plurality of transistors having their collector-emitter paths circuited in parallel and their emitters connected in common, the number of such transistors being equal to the number of input signals of one form, with the respective bases thereof forming respective independent inputs for input signals of such form, the other side of the differential amplifier having a transistor, the emitter of which is connected in common with said transistors of the first side and the base of which is connected, over a resistance, to reference potential and to the base and collector of a multi-emitter transistor having an emitter for each of said independent input signals of the other form, and a respective transistor connected to each of said emitters of the multi-emitter transistor, circuited as an emitter follower, with the bases thereof forming independent inputs for each respective input signal of the other form.

6. A gate switching circuit according to claim 5, for the formation of an OR-NOR linkage of input signals, wherein the bases of said parallel-circuited transistors form the inputs to which input signals in their normal form are to be supplied, and the bases of the emitter-follower transistors form the inputs to which input signals in their inverted form are to be supplied.

7. A gate switching circuit according to claim 5, for the formation of an AND-NAND linkage of input signals, wherein the bases of said parallel-circuited transistors form the inputs to which input signals in their inverted form are to be supplied, and the bases of the emitter-follower transistors form the inputs to which input signals in their normal form are to be supplied.

8. A gate switching circuit according to claim 5, comprising in further combination, an emitter-follower stage for each side of the differential amplifier, each comprising a transistor having its base connected to the output of the corresponding side of the amplifier and its emitter forming an output therefor.

* * * * *